3,426,594
FLYBALL INTEGRATOR CUTOFF
Howard W. Nudd, Jr., Foxboro, Mass., assignor to The Foxboro Company, Foxboro, Mass., a corporation of Massachusetts
Filed Apr. 14, 1967, Ser. No. 631,055
U.S. Cl. 73—206
Int. Cl. G01f 1/02
6 Claims

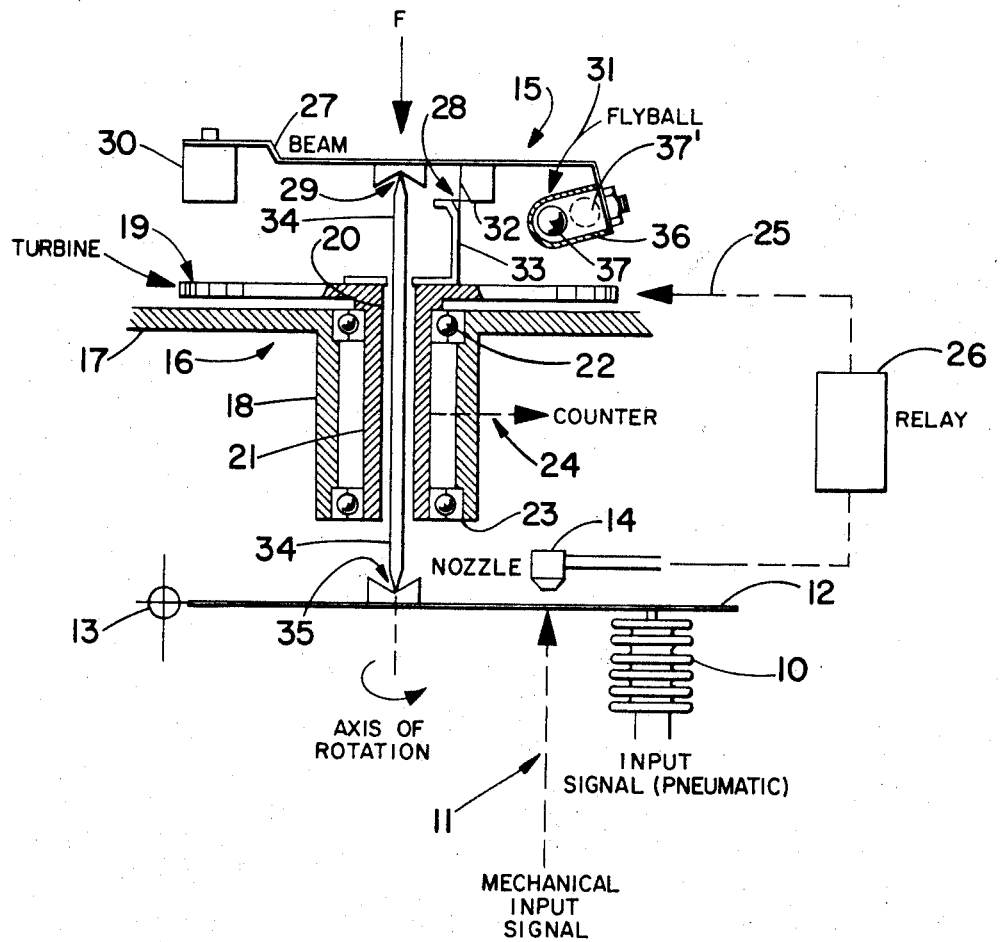
FIG. I

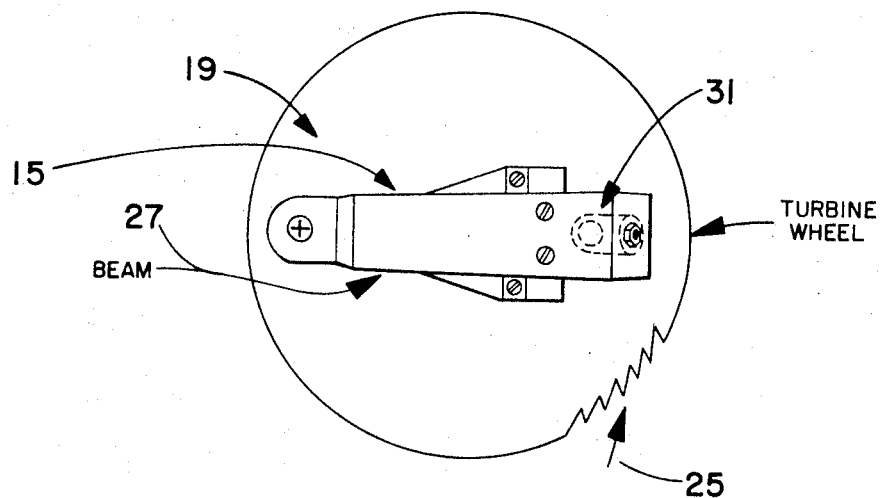
FIG. II
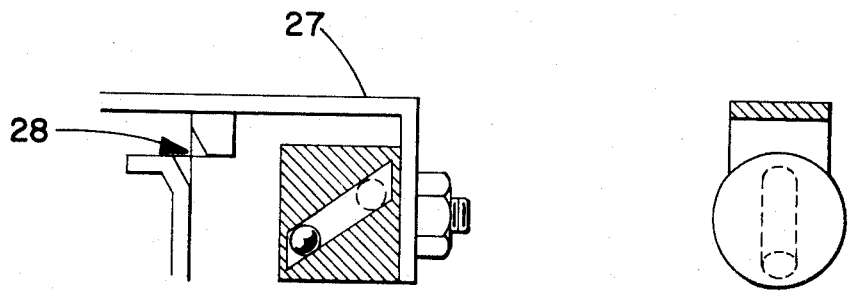
FIG. III
FIG. III A

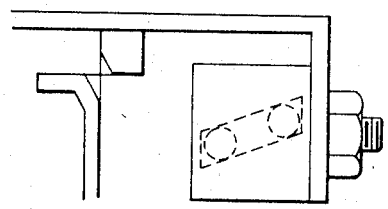
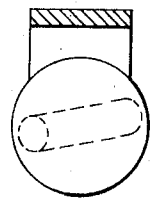
FIG. IV    FIG. IV A
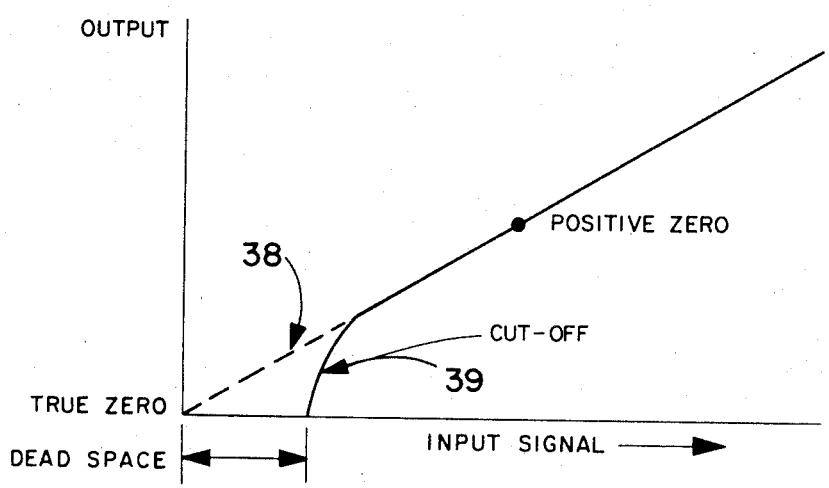
FIG. V ns Patent Office 3,426,594
Patented Feb. 11, 1969

ABSTRACT OF THE DISCLOSURE

Industrial process variable measurement in terms of the speed of a jet actuated turbine wheel system including flyball low range cutoff means. The flyball is supported on the turbine wheel on an incline which is inclined upwardly in the outward direction of the radius of the wheel. Above a predetermined minimum speed of the turbine wheel, the ball moves upwardly on the incline to a centrifugal force controlled location. When the speed of the turbine wheel goes below the predetermined speed, the ball rolls down the incline providing a direct and abrupt low-speed cutoff.

---

This invention relates to systems of industrial process control instrumentation. It has particular reference to fluid flow measuring turbine flyball integrators. The nature of such integrators is set forth in U.S. Patent 2,930,231, issued to H. L. Bowditch, and in U.S. patent application Ser. No. 494,032, filed by Howe, Cook and Nudd, Jr., Oct. 8, 1965.

In the instrument described in that patent, and on which that pending application is based, a signal corresponding to a flow representative differential pressure is applied to a balanceable member to which is also applied an opposing force developed by a rotating flyball. This flyball is pivotally supported on a turbine wheel the speed of which is controlled by the balanceable member in such a manner as to maintain the forces on this member in balance.

Since the centrifugal force generated by a rotating flyball is proportional to the square of its velocity of rotation, the speed of the turbine wheel will, when the balanceable member is stationary, be directly proportional to the flow rate of the fluid being measured. By connecting the rotating shaft of the turbine wheel to a counter device arranged to indicate the total number of revolutions of this shaft, there is provided a means for measuring the total volume of liquid flow over a given period of time.

In the use of such integrators, there is often a problem less than full shutoff at zero and of error at the bottom of the measurement range. This may be due to various combinations of mechanical and fluid errors which become apparent at low flows and low turbine speeds. The error area is in the order of the lowest ten percent of scale.

This invention obviates this error difficulty by providing a low range cutoff which bypasses the error area to bring the control signal to zero more directly and abruptly and to assure shutoff at zero. There is then no power jet applied to rotate the turbine wheel and the wheel stops. Thus, when input zero is reached, there is a dead-space area in which the output is zero. The input signal, from zero, must be raised to a minimum before there is any output, and the initial increase output curve thereafter is steep. Thus, full shutoff at zero is accomplished, and during both signal increase and signal decrease, any low range error factors are very rapidly passed over, and are ineffective.

A particular application of this invention is its use with the integrators described in the patent and patent application mentioned hereinbefore. It is further applicable to variants of these structures.

It is therefore an object of this invention to provide a new and useful flyball integrator system.

Other objects and advantages will be in part pointed out hereinafter or set forth in the accompanying drawings, in which:

FIGURE I is a schematic illustration of a flyball integrator system according to this invention;
FIGURE II is a top view schematic of the upper portions of the system of FIGURE I;
FIGURE III illustrates an alternative flyball structure;
FIGURE IIIA is an inner end view of the structure of FIGURE III;
FIGURE IV is the structure of FIGURE III adjusted to a different position;
FIGURE IVA is an inner end view of the structure as presented in FIGURE IV; and
FIGURE V is an operational curve according to this invention.

The flyball system of FIGURE I may be used to measure fluid flow. From the flow sensing means (not shown), a suitable input signal may be applied to the system of FIGURE I.

This input signal may be pneumatic, as indicated by bellows 10, or it may be mechanical, as indicated by the dotted line arrow 11.

In either case the input signal is applied to one side of an elongated rigid force bar 12, which is pivoted at one end as at 13. Thus the input signal tends to move the force bar in one direction about the pivot 13. Suitable bias spring means (not shown) may be used against the force bar 12 in opposition to the input signal means, to achieve a balanced condition of the force bar 12 about its pivot at a selected value of input signal.

A nozzle 14 is located in facing adjacency with respect to the force bar 12. Thus a nozzle-baffle system is provided, with the force bar as the baffle. Back pressure variably results in the nozzle 14 as the baffle force bar 12 is moved toward or away from the nozzle to vary the restriction thereof. Such movement of the force bar 12 is about its pivot and is caused by changes in the input signal as at 10, and by an opposing, balancing force from a flyball system 15, as will be described hereinafter.

Over the force bar 12, a turbine support body 16 is provided in the form of a top horizontal plate 17 integral with a downwardly extending central sleeve 18, with the sleeve 18 defining a vertical central opening in the support body.

A turbine wheel 19 is horizontally disposed over the support body 16, and has a central opening 20 therethrough, aligned with the central opening through the support body. The turbine wheel 19 is supported on an integral central sleeve portion 21 thereof which extends through the central sleeve 18 of the support body 16.

The turbine wheel 19 is held above the support body top plate 17 and is rotatable with respect thereto about the vertical central axis common to both the support body 16, and the turbine wheel 19. This is accomplished on bearing mountings 22 and 23 between the central portions of the support body 16 and the turbine wheel 19.

Measurement, of flow for example, is in terms of the rotation of the turbine wheel. Suitable rotation sensing or takeoff means for indication, recording or transfer, is indicated by the arrow 24. This may lead to a counter, for example, from the central rotatable sleeve 21 of the turbine wheel 19.

Such takeoff (24) may be in the form of a gearing, arrangement (not shown) from the bottom of the turbine wheel sleeve 21.

The turbine wheel 19 is provided with teeth throughout its periphery, and a fluid jet 25 is arranged to direct a power stream thereagainst, sufficiently at an angle in the tangential sense, to cause the turbine wheel to rotate.

The fluid jet 25 is provided with a power stream from a fluid relay 26, which is operated by back pressure from the nozzle 14. Accordingly, increased restriction of the nozzle 14 by the force bar 12 results in increased rotational speed of the turbine wheel 19. As the nozzle-baffle restriction is lessened the turbine slows down.

As a feature of this invention, when the measurement input signal to the force bar is lessening, it reaches a predetermined minimum value. At this point in the speed of the turbine, the flyball of the unit 15 is drawn radially inward and downward by gravity, calculated at this speed to overcome the centrifugal force on the flyball.

As a result of this inward movement of the flyball as will be seen hereinafter, the nozzle-baffle restriction of the force bar 12 is reduced sharply to a point of minimum baffle back pressure effect in the nozzle 14. Consequently the jet stream from jet 25 against the turbine 19 becomes effectively zero and the turbine 19 stops. The construction and mounting of the turbine wheel 19 is such that its response to change in the power stream from the jet 25 is prompt. Thus when the power stream goes to effective zero, the turbine wheel stops quickly.

The flyball has cutoff low range response in the system by opening up the space between the nozzle 14 and the force bar 12. Thus shutoff at zero is assured by altering the calibration curve. When the input signal, at 10, grows large enough to speed up the turbine, centrifugal force overcomes the gravity effect on the flyball, and normal operation of the turbine and nozzle-force bar system is resumed.

In FIGURES I and II, the flyball system 15 comprises a beam 27 overlying the turbine wheel 19 on a diameter of the turbine wheel. The flyball system 15 has a horizontal flexure pivot point at 28, a vertical force point at 29, a counterweight 30 at one end of the beam 27 and the flyball unit itself 31 at the other end of the beam 27.

The flyball system is mounted on the turbine wheel 19 for rotation therewith. This is accomplished through the cross-flexure pivot at 28 with a horizontal and a vertical flexure strip crossing each other to form the pivot point 28. The flexure strips are secured to a mounting block 32 on the underside of the beam 27 and to a mounting bracket 33 on the top of the turbine wheel 19. This mounting arrangement locates the flexure pivot 28 on a radius of the turbine 19 and spaced radially outward of turbine central opening 20.

As an example of one possible arrangement, the center of gravity of the counterweight 30 is somewhat above the flexure pivot point 28, and the center of gravity of the flyball unit 31 is somewhat below that point.

The vertical force point 29 of the flyball beam 27 is on the common vertical central axis of the turbine wheel 19 and the support plate 16. A vertical force connector rod 34 extends through the turbine sleeve 21 and is mounted with effectively point bearing contact on the under side of the flyball beam at the force point 29, and on the top side of the force bar 12 at 35. Accordingly, forces on the force bar 12 are transmitted to the flyball beam in terms of pivoting that beam about the flexure pivot point 28. Conversely, movement of the flyball beam about the pivot 28 transmits force to the force bar 12 in terms of pivoting that bar about its pivot 13.

The flyball unit 31 comprises a tubular housing 36 secured to a depending end 37 of the flyball beam 27. The tubular form of the housing 36 is on an incline, on a radius of the turbine wheel 19, and inclined upwardly in the outward direction of that radius. A free ball 37 is located within the housing 36 and shown in full line at the bottom of the housing in the off or pedetermined minimum operating condition of the system. This is the gravity controlled location of the ball 37.

When the turbine wheel is above the predetermined minimum rotational speed, centrifugal force moves the ball radially outward of the turbine, and up the incline of the housing 36, to the centrifugal force controlled location of the ball as in dotted line at 37'.

While various interacting forces are involved, static and dynamic, the overriding operational effect is a counterclockwise tilting of the flyball beam 27 about the flexure pivot 28 as the turbine speed is increased. This action produces increasing balance force on the force bar 12 against the increased input signal in the bellows 10 which caused the increased turbine speed.

As the input signal decreases and the turbine speed consequently decreases, the flyball beam 27 exerts less force on the force bar, to balance the lesser input signal.

FIGURES III, IIIA, IV and IVA illustrate an alternative flyball structure, rotatably adjustable about its mounting to the flyball beam 27. FIGURES III and IIIA illustrate the same arrangement as in FIGURE I. FIGURES IV and IVA illustrate a position of lesser incline for the flyball. Such adjustment changes the rate or curve of the cutoff action and creates a predetermined dead space at zero input signal.

However, when the turbine speed, in decreasing, reaches the predetermined minimum, the centrifugal effect of the ball 37 gives way to gravity and the ball rolls down its incline. This reduces the moment arm of the ball in relation to the flexure pivot 28 and the counter weight 30 has more effect, that is, it appears heavier. A greater force is thus applied to the force bar 12 as the input signal at 10 continues to decrease and at zero the input bellows 10 force is overbalanced and the turbine stops.

The FIGURE V curve showing indicates in dotted line 38 the area of output without a rolling flyball, and in cutoff line 39 the action when the flyball rolls down, or up its incline.

The "positive zero" indication is an "about ground" working null balance point often preferred in the use of such systems. The "true zero" may represent actual zero of the measured variable, such as flow, or some positive minimum of flow, as desired.

This invention therefore provides a new and useful flyball integrator utilizing the action of a free rolling ball flyball device.

I claim:

1. A flyball and turbine wheel combination instrument system operable by a fluid nozzle-baffle system as the basis of process measuring means for conditions such as fluid flow, said combination instrument system comprising, a peripherally articlated, rotatable turbine wheel, and a fluid jet located to direct a fluid stream against the articulations of said turbine wheel to produce said rotation thereof, a flyball system mounted on said turbine wheel for rotation therewith, the mounting for said flyball system including a cross-flexure pivot about which said flyball system tilts in accordance with the speed of said turbine wheel, fluid nozzle-baffle means responsive to the measured value of a variable process condition to vary said fluid stream against said turbine in accordance with changes in said process condition, a mechanical connection between said flyball system and said nozzle-baffle means in opposition to the effect of said process condition effect, and a free rolling ball on an inclined plane in said flyball system whereby increased turbine speed drives said ball up said inclined plane and upon a decrease of turbine speed, a predetermined minimum speed results in said ball moving down said inclined plane under the influence of gravity, to decrease the effect of said flyball system on said nozzle-baffle means thereby producing a low range cutoff effect on said fluid stream as applied to said turbine wheel, which results in full shutoff of said fluid stream.

2. An instrument system according to claim 1 in which said flyball system is provided with a channeled stud as said inclined plane.

3. An instrument system according to claim 2 in which said channeled stud is rotatably adjustable to vary the rise of said inclined plane whereby the rate of turbine jet stream cutoff is varied, and the amount of dead space is determined.

4. An instrument system according to claim 1 wherein the process condition value representation is applied to said nozzle-baffle means mechanically.

5. An instrument system according to claim 1 wherein the process condition value representation is applied to said nozzle-baffle means pneumatically.

6. Fluid flow measuring apparatus adapted to convert a differential pressure output signal developed by a flow-sensing element responsive to the fluid being measured and having a magnitude proportional to the square of the fluid flow rate, to a continuous measurement signal having a magnitude directly proportional to that flow rate, through a pivotally mounted elongated rigid force bar, through a pressure-sensitive element adapted for connection to said flow-sensing element and arranged to apply a first torque to said bar about the pivot axis thereof in accordance with the magnitude of said differential pressure signal, said apparatus comprising, in combination, a pneumatic turbine supported for rotary motion and having a plurality of teeth formed on the periphery thereof, means for directing a stream of gas against the teeth of said turbine wheel to impart rotary motion thereto, a flyball assembly mounted on said turbine wheel through a cross-flexure device, for rotation with said turbine wheel to provide pivotal movement of said flyball assembly about the axis of said cross-flexure device in response to the centrifugal force generated by the rotation of said turbine wheel, mechanical linkage means connected between said flyball assembly and said force bar for transmitting the centrifugal force so produced to said force bar so as to apply a second torque thereto in opposition to said first torque, and pressure control means responsive to the positioning of said force bar, said control means being arranged to vary, in response to changes in the positioning of said bar, the velocity of the stream of gas fed to said turbine wheel in such a manner that the centrifugal force generated by said rotating flyball and transmitted to said bar continuously balances said bar by countering changes in torque thereon due to changes in the flow rate of said fluid, whereby the speed of said turbine wheel is substantially maintained at a value directly proportional to the flow rate of the fluid being measured, said flyball assembly including a free rolling ball on an incline at one side of said assembly, in such relation to said turbine wheel as to drive said ball up said incline and radially outward of said turbine wheel upon increased speed of said turbine wheel, said ball, upon decreased speed of said turbine wheel to a predetermined minimum, being caused by gravity to roll toward the center of said turbine wheel and cause a substantial change in said force bar position, sufficient to abruptly and directly reduce to zero said stream of gas against said turbine wheel.

References Cited

UNITED STATES PATENTS

| 2,575,304 | 11/1951 | Stover | 73—206 |
| 2,930,231 | 3/1960 | Bowditch | 73—206 |
| 3,006,191 | 10/1961 | Graves et al. | 73—206 |

RICHARD C. QUEISSER, *Primary Examiner.*

EDWARD D. GILHOOLY, *Assistant Examiner.*

U.S. Cl. X.R.

235—61